Figure 4:
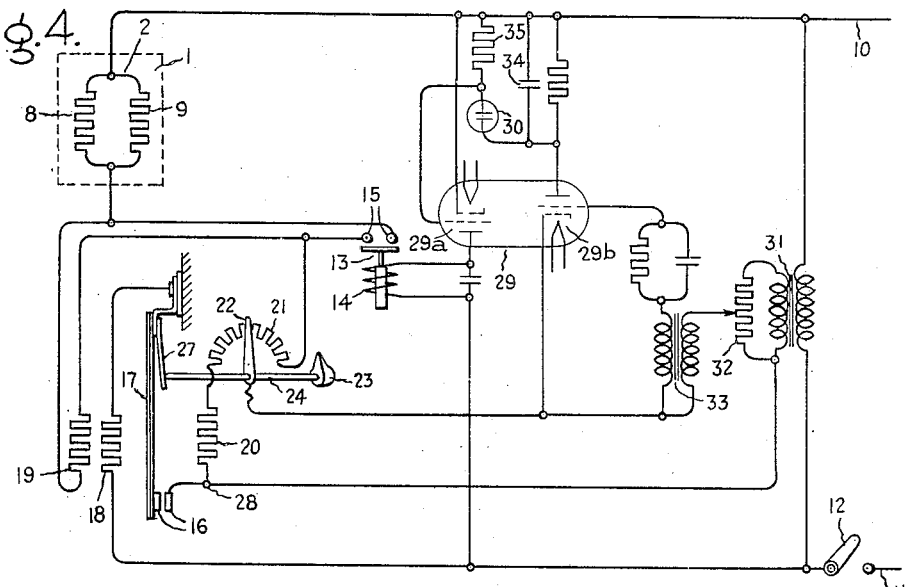

Aug. 16, 1949.  G. C. CROWLEY ET AL  2,479,319
CONTROL FOR ELECTRIC BLANKETS OR THE LIKE
Filed July 12, 1947  2 Sheets-Sheet 1
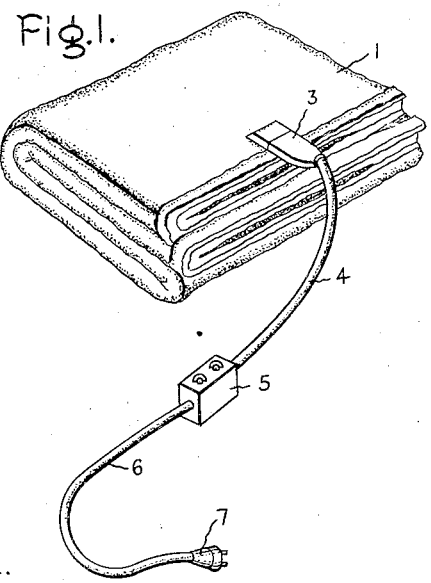
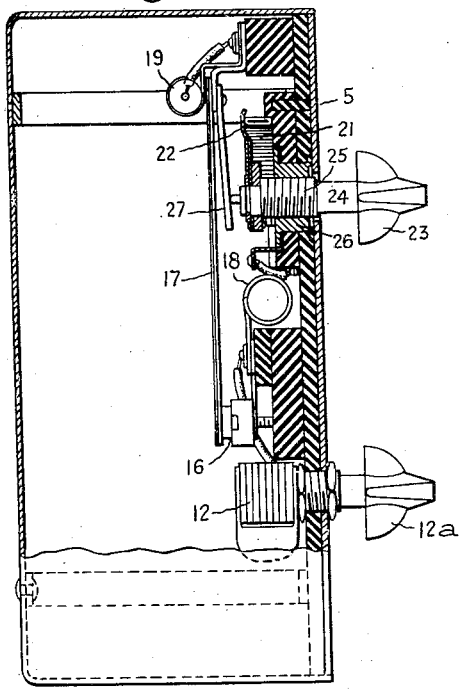
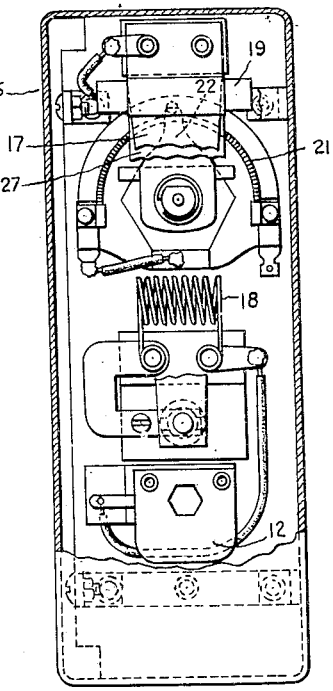
Inventors:
George C. Crowley,
Philip Klein,
by Alfred T. Bobst
Their Attorney.

Aug. 16, 1949.  G. C. CROWLEY ET AL  2,479,319
CONTROL FOR ELECTRIC BLANKETS OR THE LIKE
Filed July 12, 1947  2 Sheets-Sheet 2

Inventors:
George C. Crowley,
Philip Klein,
by Alfred E. Bobst.
Their Attorney.

Patented Aug. 16, 1949

2,479,319

UNITED STATES PATENT OFFICE 2,479,319

CONTROL FOR ELECTRIC BLANKETS OR THE LIKE

George C. Crowley and Philip Klein, Bridgeport, Conn., assignors to General Electric Company, a corporation of New York Application July 12, 1947, Serial No. 760,610

4 Claims. (Cl. 219—46)

This invention relates to controls for electric heating devices such as electric blankets or the like and has for its object the provision in apparatus of this character of improved means for controlling the heating circuit thereof.

In the copending application of George C. Crowley, Serial No. 730,173, filed February 21, 1947, and assigned to the same assignee as the present application, there is disclosed and claimed an improved control for an electric blanket or the like for protecting it against overheating in case the blanket is folded or rolled, either while in use or while not in use but inadvertently plugged into the supply source in such a manner as to produce an abnormally high temperature in the blanket under normal operating voltage conditions. The illustrated embodiments of the aforesaid arrangement made use of the change of resistance with change of temperature of a blanket heating winding having a high temperature coefficient of resistance to obtain a controlling voltage for the control of relay means having contacts in the blanket heating winding circuit, whereby the blanket heating winding would be deenergized, or substantially so, if abnormally high blanket temperatures should be developed. The illustrated embodiments further included a control device functioning to control the energization of the blanket responsively to room temperature variations so as to hold a substantially constant temperature in the blanket in spite of such variations in the general manner described and claimed in U. S. Patent to W. K. Kearsley No. 2,195,958, issued April 2, 1940, and assigned to the same assignee as the present application. This ambient temperature control was adjustable by the operator to produce, within limits, any desired temperature in the blanket. With such an arrangement it is evident that the safety control must be adjusted to open the blanket heating circuit only at a temperature which is a reasonable temperature above the maximum normal operating temperature which can be selected by the blanket user. Thus, when the blanket user selects a low blanket operating temperature, the range between the operating temperature and the temperature at which the safety control deenergizes the blanket heating winding is much greater than when the blanket user selects a high blanket operating temperature.

It is an object of the present invention to provide a control arrangement whereby the calibration of the safety control is automatically correlated with the selected blanket operating temperature so that maximum protection against overheating is given for all selected blanket operating temperatures.

The present invention will best be understood from the following description taken in connection with the accompanying drawings in which Fig. 1 illustrates an electrically heated blanket and control device embodying this invention; Fig. 2 is a partial longitudinal section through a portion of the control device; Fig. 3 is a bottom view of the device of Fig. 2 with the bottom plate and some other elements partially cut away; Fig. 4 is a diagrammatic representation of the blanket and control arrangement; and Fig. 5 is a similar diagrammatic representation of a modification of Fig. 4.

Figure 5:
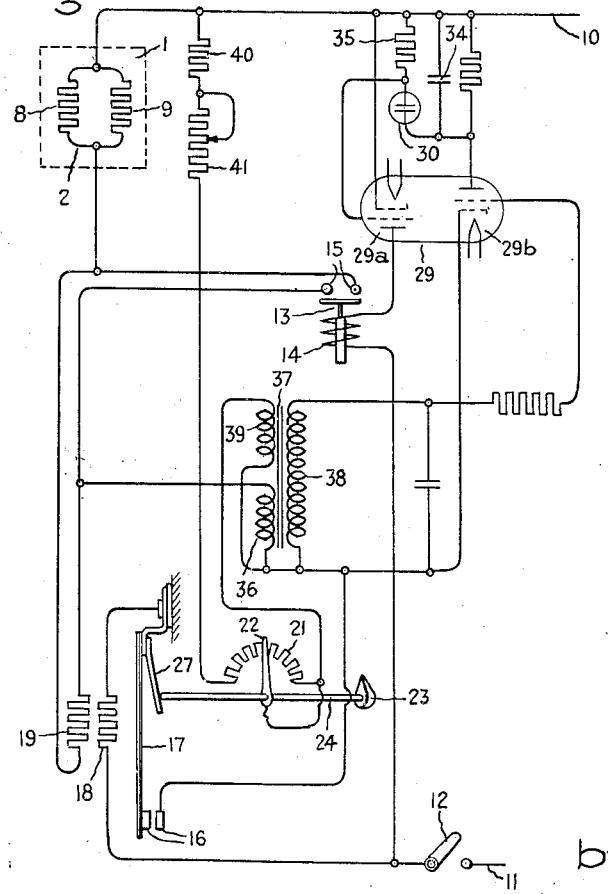

Fig. 1 illustrates the invention as applied to an electrically heated blanket 1 having a heating winding 2 diagrammatically illustrated in Figs. 4 and 5. The heating winding emerges from the blanket at a connector 3 whereby it is connected through cable 4 to a control device 5 and thence by cable 6 to plug 7 which is adapted to be connected to a suitable source of alternating current supply.

The mechanical arrangements of the control device 5, in so far as material to the present invention, are illustrated in Figs. 2 and 3, while the electrical arrangements of the device 5 together with the details of its circuit connections to the blanket heating windings 2 are illustrated in Figs. 4 and 5.

The blanket heating winding may comprise a pair of resistance elements 8 and 9 connected together in parallel and energized from a suitable source of alternating current supply, the opposite sides of which are denoted in Figs. 4 and 5 by the reference numerals 10 and 11. The resistance conductors 8 and 9 are preferably arranged into a number of convolutions more or less covering the entire area of the blanket. A single heating winding may be used, if desired, instead of two windings in parallel. In either case, it is preferred that the blanket body be provided with suitable channels (not shown) in which the resistance conductors are threaded. Such a blanket body is described and claimed in U. S. Patent to I. O. Moberg No. 2,203,918, issued January 11, 1940.

In series with the supply conductor 11 is a control switch 12, manually operable by the knob 12a, Fig. 2. Connected in series with the blanket heating winding 2 are the contacts 15 of a control relay 13 having an operating coil 14. The winding 14, when energized, closes the relay, and when deenergized, permits the relay to open. Also in series with the blanket heating winding 2 is an ambient temperature responsive control device which includes a bi-metallic thermostatic element 17 and cooperating contacts 16, one of which is stationary and other of which is operated by the element 17. The latter is positioned out of thermal relation with the blanket 1 so as to be unaffected directly by the heat generated therein. It is, however, affected by the room temperature and by two auxiliary heaters 18 and 19. The heater 18 is connected in series with the switch 12, the thermostat element 17, and contacts 16. The heater 19 is connected across relay contacts 15 in such a manner as to be short circuited when the latter are closed; its purpose will be described later. Also in series with the blanket heating winding 2 is a fixed resistance 20 and a potentiometer resistance 21 on which bears a brush 22 mounted on shaft 24 whose position may be adjusted by knob 23. The resistances 20 and 21 preferably have a negligible temperature coefficient of resistance. The voltage drop across resistances 20 and 21 is used for the control of relay 13 as described below. The energizing circuit for the blanket heating winding 2 can now be traced from line conductor 11 and switch 12 through auxiliary heater 18, thermostat 17, contacts 16, resistances 20 and 21, relay contacts 15, to the heating elements 8 and 9 and thence to the other side 10 of the line. It will be observed that when the relay contacts 15 are closed auxiliary heater 19 is shorted out of the circuit, while when contacts 15 are open, the auxiliary heater 19 is in the series circuit between resistance 21 and the heating windings 8, 9. The heater 19 is of a high resistance such as will permit only a very small current, insufficient to produce any appreciable heating effect to flow through the heating windings 8, 9.

In the operation of the circuit so far described, the switch 12 being closed and relay coil 14 having been energized to close contacts 15, the blanket heating windings 2 will be energized as will thermostat heater 18. When the latter has warmed the bi-metallic bar 17 sufficiently, the bar deflects so as to open contact 16 thereby interrupting the blanket heating current, as well as the current through heater 18. In a relatively short time the bi-metallic bar 17 will cool again, closing contact 16 and reenergizing winding 2 and heater 18. This operation is continually repeated, the thermostat 17 cycling on and off to energize and deenergize the blanket in response to the operation of the heater 18 to produce a substantially constant temperature in the blanket. The periods of the on-off cycles are dependent upon the ambient room temperature as well as upon the desired blanket temperature as selected by the blanket user.

For this purpose the thermostat 17 can be adjusted by means of the knob 23 whose shaft 24 has a threaded portion 25 turning in a nut 26 secured to the frame of the control device 5, a suitable mechanical arrangement of which is shown in Figs. 2 and 3. Thus, a rotation of the knob 23 displaces the end of shaft 24 axially. The latter bears against a plate 27 which is fastened to the fixed end of the bi-metallic element 17 in such a manner as to deflect the element 16 to vary the separation between the contacts 16. By this adjustment means, the thermostat is adjusted to hold different desired temperatures in the blanket.

In order to control the energization of the blanket heating winding 2 so as to prevent an abnormally high temperature condition in the blanket, an electron tube circuit arrangement similar to that described in the aforesaid application of George C. Crowley, Serial No. 730,173, may be used. The blanket heating windings 8 and 9 are made of a material having a relatively high temperature coefficient of resistance, such as copper or a suitable alloy thereof. The resistances 20 and 21 on the other hand, are made of a material which has a substantially negligible temperature coefficient of resistance, as for example nichrome. Thus, as the blanket temperature rises, the resistance of the blanket heating elements 8 and 9 increases and the total current in the blanket circuit and in resistance 20 and 21 decreases. This results in a decrease in the voltage drop across the resistances 20 and 21 and this voltage drop is used to protect the blanket against overheating. The control voltage is taken between the lower terminal 28 of resistance 20 and the brush 22 on resistance 21. The control voltage may be applied to any suitable arrangement for controlling the blanket current flow and interrupting or decreasing it in the event of overheating of the blanket. We prefer, however, to use the electron tube circuit shown in the aforesaid application of George C. Crowley, or an equivalent vacuum tube circuit to control the energization of relay coil 14.

The electron tube control circuit illustrated in Figs. 4 and 5 are described in detail in the said Crowley application to which reference is made for such details. It will be described only briefly herein to the extent necessary to explain the present invention. The circuit includes a high vacuum tube 29 of the double triode type having a section 29a normally biased to produce an anode current which energizes the winding 14 of relay 13 and thereby closing the contacts 15. Tube 29 also has a second section 29b which controls the operation of a gas filled diode 30. The latter, when it fires, interrupts the current through tube section 29a, thereby deenergizing the relay 13. For the control of tube section 29b, the voltage drop across the control resistances 20 and 21 is opposed to a reference voltage, obtained from transformer 31 and potentiometer 32, and the difference voltage is impressed on transformer 33 which energizes the grid of tube section 29b. As the control voltage decreases due to abnormal increase in the blanket temperature, the grid of tube 29b becomes less negative and the anode current through this tube charges a condenser 34 which will cause the gas filled diode 30 to become conductive, thereby causing current to flow through resistance 35. The control grid of tube section 29a is thereby made more negative to cut off anode current flow through the tube whereby relay 13 becomes deenergized and contacts 15 open.

It will be observed that the temperature of blanket 1 at which the relay circuit functions to deenergize the blanket is adjustable by varying the position of potentiometer brush 22. The opposing reference voltage 32 having been established, the value of the control voltage obtained from resistors 20 and 21 can be varied by turning the knob 23 and thereby moving the brush 22 on resistance 21. According to the present invention this is accomplished simultaneously with the adjustment of thermostat 17 so that as a cooler normal blanket temperature is selected, a lower control voltage will simultaneously be selected whereby the abnormal temperature at which relay 13 is opened will be correspondingly reduced.

When, on the contrary, the blanket user selects a high normal operating temperature he will automatically simultaneously increase the normally applicable control voltage whereby the safety control will deenergize the blanket only at a proportionately higher temperature.

Fig. 5 shows a modification of the circuit arrangement of Fig. 4. In this modification the relay control voltage is obtained in a different manner. Instead of utilizing the voltage drop across a resistance, the blanket heating winding 2 is connected in series with a primary winding 36 of a transformer 37 having a secondary winding 38 which is connected to the grid circuit of vacuum tube section 29b. The transformer 38 is provided with a second primary winding 39 which is wound in the opposite direction to the primary winding 36. The voltage induced in secondary 38 therefore represents the difference between the inductive effects of primary windings 36 and 39. Primary winding 39 is connected across the supply line in series with resistors 40, 41 and the portion of potentiometer resistance 21 between one of its terminals and the brush 22 whose position is simultaneously variable with the adjustment of thermostat 17 as in the previous modification. The same mechanical arrangement shown in Figs. 2 and 3 can be used for this purpose.

In the operation of the modified circuit of Fig. 5, the blanket current, which flows through primary 36 and varies with the temperature and resistance of the blanket heating windings 39, is limited by resistance 40 and is initially adjustable by means of variable resistance 41 and is further adjustable coincidently with adjustment of thermostat 17, by adjustment of the position of brush 22 on resistance 21. Thus, as the blanket user selects a lower blanket operating temperature, the current through primary winding 39 is automatically increased whereby a higher voltage is induced thereby in the secondary 38 to oppose the voltage induced by the blanket heating current flowing through winding 36. Consequently, a lesser increase in resistance of the heating conductors 8 and 9 is required to fire the gaseous tube 30 and cut off the current in tube section 29a to remove the energization of relay coil 14 and to open the relay contacts and reduce the blanket heating winding current. In other words, the safety calibration of the system is set at a lower value for low selected blanket operating temperatures than for high selected temperatures.

In both the modifications of the invention as illustrated in Figs. 4 and 5, the relay contacts are shunted by auxiliary heater 19. Thus, when the relay contacts open, the auxiliary heater 19 is placed in series with the blanket heating winding 2 and the remainder of the circuit. The resistance of heater 19 is, however, chosen high enough so that only a very small current will flow through the blanket heating winding, but so that the resistance 19 will produce sufficient heat to cause thermostat 17 to open. Since vacuum tube section 29b receives its anode voltage through the circuit containing contact 16 in series, the opening of these contacts will have the effect of removing the anode voltage of tube section 29b. Consequently, anode current will thereupon be reestablished in tube section 29a, thereby again energizing relay coil 14 and reclosing the relay. If by this time the blanket has cooled sufficiently, normal operation will be resumed, but if the blanket is still too hot so that the blanket heating conductors 8, 9 have too high a resistance, tube 30 will again fire, cutting off the anode current in tube 29a and deenergizing the relay. The auxiliary heater 19, therefore, acts as an automatic means for testing the circuit, so to speak, to determine whether the condition which caused the overheating of the blanket has been removed. However, if desired, the auxiliary heater 19 may be omitted from the circuit by joining the conductors to which its ends are connected. When this is done and an overheating of the blanket occurs, the relay 14, having once been opened, will remain open until the entire system is deenergized, as by opening switch 12 and thereafter reclosing it.

While we have shown and described particular embodiments of our invention, it will be obvious to those skilled in the art that various changes and modifications may be made without departing from our invention in its broader aspects and we, therefore, aim in the appended claims to cover all such changes and modifications as fall within the true spirit and scope of our invention.

What we claim as new and desire to secure by Letters Patent in the United States is:

1. In combination with an electric blanket having a heating winding, a thermostatic ambient temperature responsive switch adapted intermittently to connect and disconnect said heating winding to and from a power source for regulating the temperature in said blanket, means for adjusting the temperature responsive of said switch for changing the regulated temperature in said blanket, an electron tube safety circuit operable independently of said switch for at least partially deenergizing said heating winding in response to an abnormal increase in the temperature thereof to a predetermined value, and means for adjusting said electron tube circuit for changing the response temperature thereof, said switch adjusting means and said circuit adjusting means being interlocked for simultaneous operation.

2. In combination with an electric blanket having a heating winding with a high temperature coefficient of resistance, a resistance having a substantially zero temperature coefficient of resistance connected in series with said winding, a thermostatic ambient temperature responsive switch having contacts connected in series with said winding and adapted intermittently to connect and disconnect said heating winding and resistance to and from a power source for regulating the temperature in said blanket, an electron tube safety circuit operable independently of said switch and including contacts in circuit with said winding for reducing the current through said heating winding in response to an abnormal decrease in the current in said series resistance below a predetermined value due to an abnormal increase in the temperature of said heating winding to a predetermined value, means for adjusting the temperature response of said switch for changing the regulated temperature in said blanket and means for varying the effective value of said series resistance, said switch adjusting means and said resistance varying means being interlocked for simultaneous operation.

3. In combination with an electric blanket having a heating winding with a high temperature coefficient of resistance, a transformer having primary and secondary windings, a primary winding being connected in series with said heating winding whereby a change in the temperature of said heating winding produces a change in the resistance thereof and, when energized, a consequent change in the current through said primary winding and in the potential produced thereby in said secondary winding, a vacuum tube circuit having a normal current flow in a portion thereof and adapted to produce a change in said current flow in response to a predetermined change in said induced voltage, relay means operated by such change in current flow for substantially disconnecting said blanket from a supply circuit, a resistance connected in series with one of said transformer windings, means for adjusting the effective value of said resistance for changing the voltage induced in said secondary winding in response to a predetermined change in said primary winding current, a thermostatic device for regulating the temperature in said blanket, means for adjusting said thermostatic device for changing the regulated temperature in said blanket, and means for interlocking said thermostatic device adjusting means and said resistance adjusting means for simultaneous operation.

4. In combination with an electric blanket having a heating winding with a predetermined temperature coefficient of resistance, a resistance having a substantially zero temperature coefficient of resistance connected in series with said heating winding, a temperature responsive switch connected with said heating winding and resistance for intermittently connecting and disconnecting said heating winding and resistance to external power conductors for regulating the temperature in said blanket, auxiliary switch means operable independently of said switch for controlling the supply of power to said heating winding responsively to a decrease in the current in said series resistance below a predetermined value due to an abnormal increase in the temperature of said heating winding to a predetermined high value, means for adjusting the temperature response of said switch for changing the regulated temperature in said blanket and means for varying the effective value of said resistance, said switch adjusting means and said varying means being interlocked for simultaneous operation.

GEORGE C. CROWLEY.
PHILIP KLEIN.

REFERENCES CITED

The following references are of record in the file of this patent:

UNITED STATES PATENTS

| Number | Name | Date |
|---|---|---|
| 1,374,230 | Petrovics | Apr. 12, 1921 |
| 2,006,282 | Smith | June 25, 1935 |
| 2,109,848 | Olds | Mar. 1, 1938 |
| 2,112,682 | Ryder | Mar. 29, 1938 |
| 2,302,924 | Valverde | Nov. 24, 1942 |
| 2,349,849 | Deal | May 30, 1944 |
| 2,354,918 | Kearsley | Aug. 1, 1944 |
| 2,440,041 | Clark | Apr. 20, 1948 |

FOREIGN PATENTS

| Number | Country | Date |
|---|---|---|
| 221,480 | Great Britain | Feb. 19, 1925 |